June 30, 1964 J. MURGUE ETAL 3,138,972
TRANSMISSION MECHANISM FOR MATERIAL HANDLING VEHICLES
Filed Nov. 30, 1960 6 Sheets-Sheet 1

United States Patent Office 3,138,972
Patented June 30, 1964

3,138,972
TRANSMISSION MECHANISM FOR MATERIAL HANDLING VEHICLES
Joseph Murgue and Georges Rivoire, Saint-Etienne, Loire, France, assignors to Etablissements J. Rivoire, Saint-Etienne, Loire, France, a French company
Filed Nov. 30, 1960, Ser. No. 72,629
Claims priority, application France Dec. 8, 1959
14 Claims. (Cl. 74—764)

This invention relates to transmission mechanisms for reducing the speed of motor vehicles and reversing the direction of movement thereof which require rapid, substantially immediate, and relatively frequent reversal of the direction of movement thereof. The transmission mechanism may be automatically disconnectible whenever the vehicle exceeds a predetermined safe speed.

The transmission mechanism is applicable to all motor driven vehicles which need to be maneuverable and which may be used for mechanical handling of goods as for instance inside factories where the area available for maneuvering is relatively limited. Very frequent reversal of the direction of movement of the vehicles are necessary and is often performed when the vehicle is still moving particularly to stop the vehicle suddenly to avoid striking an obstacle or personnel. Normally vehicles thus operated require frequent, important, and relatively expensive repairs or maintenance. Such vehicles also become worn out relatively quickly and their running and maintenance costs are relatively high. The automatically disconnectible velocity-controlled transmission mechanism for reducing the speed of the motor vehicle and reversing the direction of movement thereof is hydraulically operated to overcome the above disadvantages and to enable driving these motor vehicles more easily, more smoothly, and with a greater degree of control by enabling the frequent reversal of the direction of movement while the vehicle is still moving as well as directing movement of the vehicle at a reduced speed while the vehicle is still in its original direction of motion.

The transmission mechanism is positioned between the engine of the vehicle and the final drive or propelling shaft to the driving wheel and it is automatically disconnected so as to be inoperable whenever the vehicle is moved above a predetermined speed and connected regardless of whether the vehicle moves in the forward or reverse direction.

It is an object of the present invention to provide a transmission mechanism for reducing the speed of a motor vehicle and for reversing the direction of movement thereof regardless of the direction of movement thereof and which is operable while the motor vehicle is still moving.

It is another object of the present invention to provide a transmission mechanism for reducing the speed of a motor vehicle and for reversing the direction of movement thereof which is automatically disconnectible or velocity controlled so that the mechanism is disengaged whenever the vehicle or its engine exceeds a predetermined or safe speed.

For a better understanding of the invention and to show how the same may be carried into effect, reference will now be made to the accompanying drawings, in which.

The transmission mechanism assembly in accordance with the invention is housed and carried in a casing 1 preferably of cast metal and consisting of several removable parts which are held assembly by bolts and nuts in well known manner and which is fluid-tight by the provision of sealing gaskets wherever required between the parts. For instance, the casing 1 may be formed with a circular rim $1^1$ for facilitating connection of the casing with an end cover of the engine of the vehicle, which is not shown.

The casing 1 is provided with an internal dividing wall $1^2$ which divides the casing into two compartments. One of the compartments is adapted to contain a fluid coupling or hydraulic torque converter. The other of the compartments is adapted to contain a gear train which consists of two planetary gearings, two brakes for the gear trains, and a change-over valve for alternatively or selectively operating the gear trains, the change-over valve including a safety controller for disconnecting the transmission mechanism assembly from the final drive shaft when the speed of the vehicles exceeds a predetermined limit.

The lower part of the casing 1 is made hollow in order to provide a space adapted to partly receive a pump 13 which supplies oil under pressure for lubrication of the parts of the transmission mechanism and for the actuation of brakes provided to operate the mechanism. An oil pan cover 2 engages with a rim $1^3$ formed in the lower part of the casing 1 and a sealing gasket 3 is positioned in the joint between the casing and the cover.

The hydraulic fluid coupling or hydraulic torque converter is well known and comprises a plate 4 driven in any well known manner by engagement with the end of the engine shaft. The plate 4 is in meshing engagement with a coupling member 5 attached to a cover 6 which drives the impeller 7 of the fluid coupling or hydraulic torque converter. The impeller 7 is attached to a bearing 8 which is in frictional engagement with an annular sealing bearing 9 attached to a hub $1^4$ formed in the dividing wall $1^2$. The bearing 8 is formed with external teeth $8^1$ which mesh with a connecting gear 10 rotatably carried by pin 11 which extends between two walls of the casing. The connecting gear 10 meshes with a driven gear 12 which drives an oil pump 13 mounted in the lower part of the casing 1.

The hydraulic fluid coupling or hydraulic torque converter also includes, in well known manner, a stator 14 formed with blades or vanes which is rotatably carried by roller bearings on a bearing retainer 15. The bearing retainer is attached to and projects within the hub $1^4$ and the stator 14 is held axially fixed with respect to the bearing retainer 15 so that it cannot slide longitudinally. The driven member 16 of the fluid coupling is attached to an internally splined sleeve $16^1$ which is adapted to engage with a splined end formed in a transmission shaft 17 so that the shaft 17 rotates with the driven member. The transmission shaft 17 is mounted on roller bearings so that it is rotatable within the bearing retainer 15.

Additional slots are provided on the transmission shaft 17 for the mounting of two sun gears 18 and 19 also slotted so that they rotate with shaft 17. The sun gears 18 and 19 form part of two planetary gearings which are adapted to transmit the power from the engine to the final drive shaft 24 when the auxiliary mechanism assembly is connected. The two planetary gearings consist of the sun gears 18, 19 which mesh respectively with planet gears 25 and 22 which are in turn respectively surrounded by internal gears 20 and 21 and in mesh therewith. The internal gear 20 is secured to a spider 23 which carries pin-supported rollers $22^1$ on which the planetary gears 22 are rotatably mounted. The spider 23 is formed with an annular end which surrounds the end of the final drive shaft 24 (partly shown in dotted lines in FIGURE 3) and which is secured for rotation therewith, in any well known manner, for instance by splining or by providing keys, pins and the like between these parts. The planet gears 25 are mounted on pin-supported rollers 26 carried between the spider 27 and the disc $27^1$ connected to the spider. Suitable roller bearings are provided in well known manner to enable rotation of spider 27, disc $27^1$ and of the spider 23 with respect to the transmission shaft 17.

Figure 5:
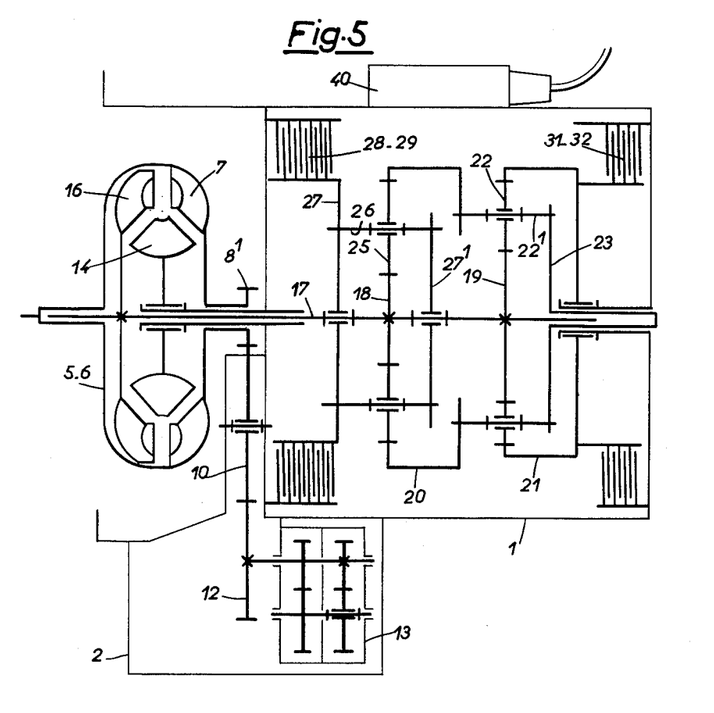
FIGURE 5 is a schematic view illustrating the kinematic chain of the transmission mechanism assembly in accordance with the present invention.

Two sets of brakes are provided in the casing 1 for selectively immobilizing either the spider 27 or the internal gear 21 of the gear trains. When the internal gear 21 is immobilized upon operation of the brakes the planet gears 22 revolve about sun gear 19 to rotate spider 23 so that the final drive shaft 24 is rotated in the direction in which the vehicle moves forward. When the spider 27 is immobilized upon operation of the brakes, the planet gears 25 are rotated by the sun gear 18 to cause rotation of the internal gear 20 which is attached to spider 23 so that the spider 23 also rotates except that the rotation is now in the reverse direction and the final drive shaft rotates in the direction in which the vehicle is now moved in the reverse direction. The kinematic chain is illustrated in FIGURE 5 and can be clearly understood therefrom.

The spider 27 and the internal gear 21 respectively are provided with collars $27^2$, $21^1$. The collars $27^2$ and $21^1$ respectively carry axially spaced brake discs 28 and 31. The dividing wall $1^2$ and a closure plate 34, which closes the end of casing 1, respectively carry rings 30 and 33. Axially spaced brake discs 29 and 32 respectively are mounted and secured on the rings 30 and 33. The brake discs 28 and 29 and the brake discs 21 and 32 are so carried by their respective parts that they alternate and are normally disengaged with respect to each other.

The brake discs are well known and they consist of any material which is selected to provide a high coefficient of friction. The selection of the set of brake discs to be operated is controlled from a change-over valve 40 to press into engagement the pairs of brake discs of one of the sets of brakes by using the change-over valve to control the direction of movement of a piston 35, in the manner described below.

It is noted that by providing the discs at the periphery of the spider 27 and of the internal gear 21 in such position that their diameters are relatively close to the maximum diameter of the casing, the total area of contact of the frictionally engaging discs faces is relatively large and provides good braking action. Also, and as described later, the cooling of the brake is also improved by better heat dissipation and dirt or scrapings worn from the discs are better removed.

Figure 1:
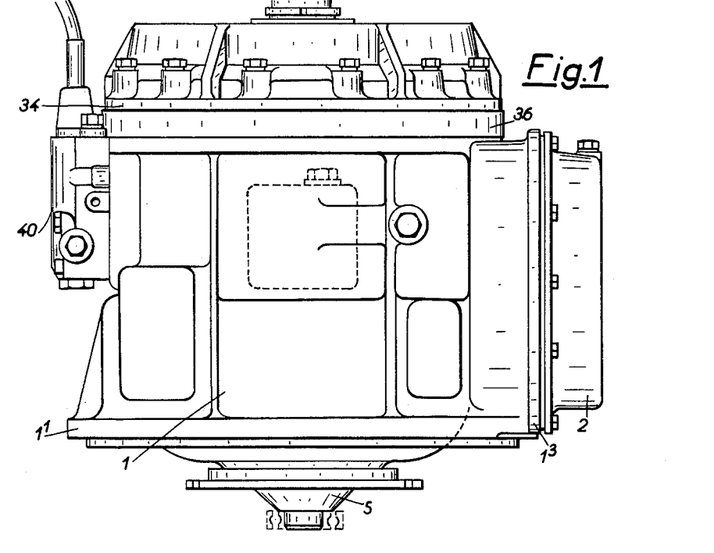
FIGURE 1 is a side view of the speed reducing and vehicle reversing transmission mechanism assembly according to the present invention.
Figure 2:
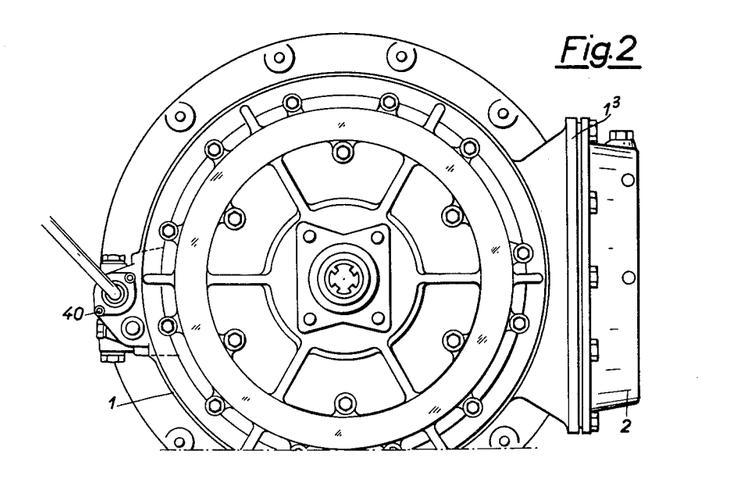
FIGURE 2 is an end view of the transmission mechanism assembly shown in FIGURE 1.

The mechanism for selectively and alternatively operating the two sets of brakes comprises a cylinder 36 mounted between the casing 1 and the closure plate 34 and an annular reciprocable double-acting piston 35 mounted within the cylinder 36. The piston 35 is provided at one end with a radial end wall $35^1$ and an annular disc $35^2$ is attached to the other end of the piston so that it forms an integral part of the piston. An internal projection $36^3$ is provided in the cylinder 36 to provide wall faces which co-operate with the end wall $35^1$ and with the annular disc $35^2$ to form two pressure chambers $36^1$ and $36^2$. The piston is normally held in central position when the two sets of brakes are disengaged by two spring mechanisms, only one of which is shown in FIGURE 1. Each spring mechanism comprises a compression spring $38^1$ extending between a flanged stem 37 and retained in a shell 38 which is held by a force fit in a closed bore formed in each of the facing walls of the projection $36^3$ facing the end wall $35^1$ or the annular disc $35^2$. Each of the stems 37 has a projecting lug adapted to press against end wall $35^1$ or annular disc $35^2$ to thereby hold the piston 35 in a central position when it is balanced and the opposite sets of brake discs 28, 29 and 31, 32 are disengaged. The pressure exerted by the lugs at the end of stems 37 is controlled to increase when the shell 38 projects more deeply in each of the closed bores and it is limited by the flanges of stems 37 which press against the seats formed in the ends of the shell. When fluid under pressure is introduced in either chamber $36^1$ or $36^2$ the piston 35 slides from central position to press and engage one of the sets of brake discs 28, 29 or 31, 32.

Figure 3:
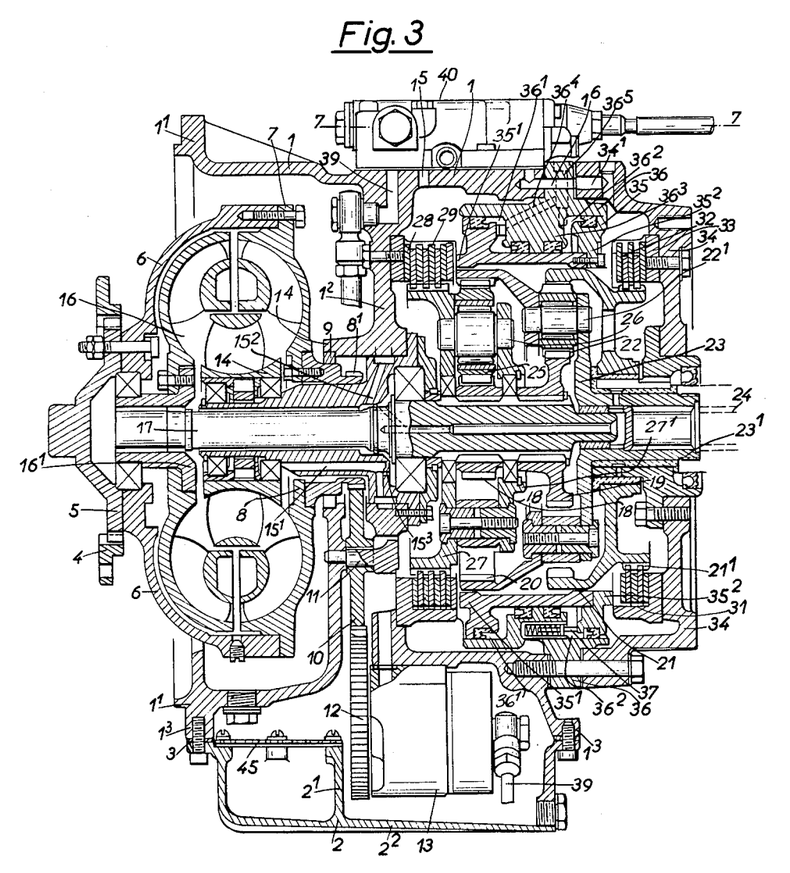
FIGURE 3 is a view in section, on an enlarged scale, of the transmission mechanism assembly shown in FIGURE 1.
Figure 4:
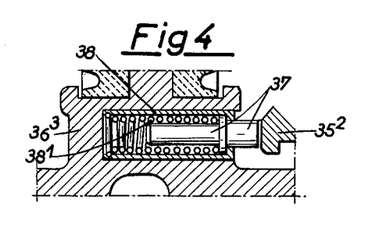
FIGURE 4 is a fragmentary view, on an enlarged scale, of a portion of the transmission mechanism assembly including means for holding a double-acting piston in neutral position, when the transmission mechanism assembly is disconnected.
Figure 6:
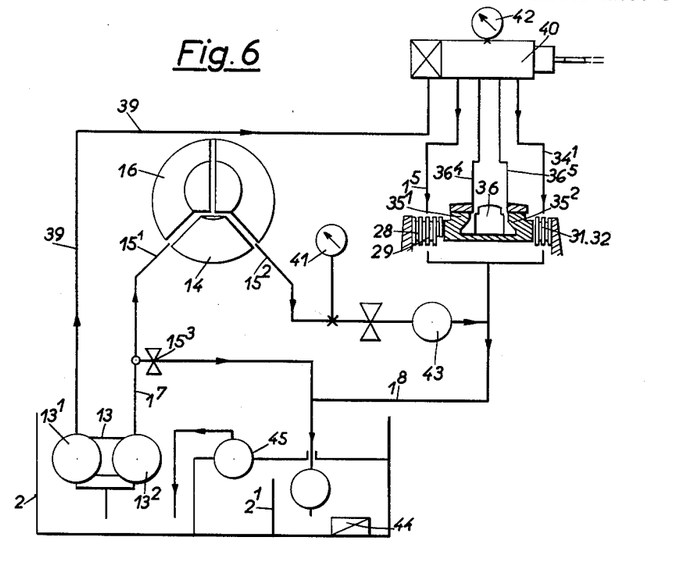
FIGURE 6 is a schematic view of the hydraulic circuit of the transmission mechanism assembly in accordance with the present invention.

Referring more particularly to the hydraulic circuit for operating or disconnecting the transmission mechanism and to FIGURES 3 and 6, oil is pumped from the pan 2 by pump 13 which is driven by the impeller 7 of the fluid coupling through gears 10 and 12. The rotary pump 13 consists of two pumps $13^1$ and $13^2$ which are assembled for parallel operation. The pump $13^1$ forces oil under pressure into the compartment containing the gear trains and the brakes through a conduit 39 which leads to the change-over valve 40 which is carried on top of the casing 1. The passages $1^5$, $1^6$ and $34^1$ are formed in the wall of the casing 1 in communication with respective passages in the change-over valve 40, in the manner described below, and they open into the interior of the casing above the two sets of brake discs 28, 29 and 31, 32 for lubricating the same. Conduits $36^4$ and $36^5$ are formed in the wall of cylinder 36 and they are in communication with respective passages in change-over valve 40, in the manner described below, in order to place pressure chambers $36^1$ and $36^2$ respectively in communication with passages in change-over valve 40.

The pump $13^2$ feeds oil under pressure into the compartment containing the fluid coupling and some of the oil is bypassed for lubricating the gear sets in the other compartment. The pump $13^2$ feeds the oil, through a passage $1^7$ formed in the dividing wall $1^2$ and through a passage $15^1$ formed in the bearing retainer 15, up to the inside of the fluid coupling in order to render the fluid coupling operative. The oil is continuously removed so that it is cooled along and around the transmission shaft 17 between the transmission shaft and the bearing retainer 15 thence through a conduit $15^2$, through a heat exchange 43 and to a return passage $1^8$ into the pan 2.

The lubricating circuit of the hydraulic fluid from the pump $13^2$ includes a throttled passageway $15^3$, the section through which is adjustable and which branches from passages $1^7$ and $15^1$. Oil flowing through passageway $15^3$ is used to lubricate the gear trains together with the oil from the hydraulic circuit for operating or disconnecting the auxiliary mechanism which is discharged from change-over valve 40 (see FIGURE 6). The flow through passageway $15^3$ is throttled in a controlled manner by a bleeder screw or a diaphragm operated member, not shown, so that the working pressure of the fluid in the fluid coupling is maintained while adequate lubrication of the planetary gear sets is permitted.

The discharge passageway $15^3$ permits using the oil from the pump $13^2$ before it is fed to the fluid coupling so that it is cooler and provides an improved lubrication whereby the gear sets lubricated are also cooled. The lubricating oil returns through openings, not shown, in the casing 1 into the pan 2.

Pressure responsive supervising valves or manometers or gauges $40^1$ and $40^2$ are provided in the oil circuit at the outlet of the fluid coupling and in the change-over valve 40 to enable controlling or maintaining the oil pressure at the outlet of the fluid coupling and in the change-over valve to make certain that pressures in the circuits are adequate to enable operation of the transmission mechanism and thereby reversing the direction of movement of the vehicle.

The oil from pump $13^2$ which passes through the fluid coupling moves along closed cycle including:

A heat exchanger 43 (FIGURE 6) between conduit $15^2$ and return passage $1^8$ to the pan 2. The heat exchanger is well known and for instance may consist of a finned radiator.

A pan 2 having dividing baffles $2^1$ to divide the pan into closed stages which permits reversing the direction of the flow of oil several times and which enables filtering the oil by separating out any foreign matter which then accumulates in the bottom of the pan 2. The bottom $2^2$ of the pan is inclined, see FIGURE 3, in order to enable periodical removal and cleaning of the pan through draining openings normally closed by drain plugs, in well known manner.

A magnetic separator 44, well known, is schematically shown in FIGURE 6 at the bottom of pan 2, in order to facilitate removal of metallic impurities, for instance scrapings, burrs and the like.

A meshed metal screen filter 45, in FIGURE 3, for filtering or straining the oil extends above the last stage of the pan 2 and the oil flows therethrough upwardly so that during its displacement the impurities are caught on the filter 45. The oil which has been filtered is then pumped through the pumps $13^1$ and $13^2$. This is particularly useful because in existing filters the downward flow of the oil impurities progressively stops up the filter to progressively throttle flow therethrough whereas by directing the flow upwards the impurities fall periodically to the bottom of the pan, whenever the engine is stopped or when the mechanism is disconnected, in the manner described below.

Figure 7:
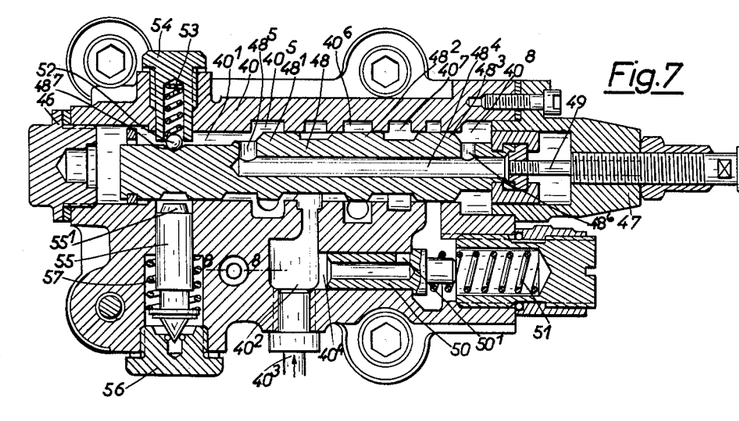
FIGURE 7 is a section view taken along the line 7—7 of FIGURE 3 of a change-over valve used in the transmission mechanism assembly.
Figures 8, 9:
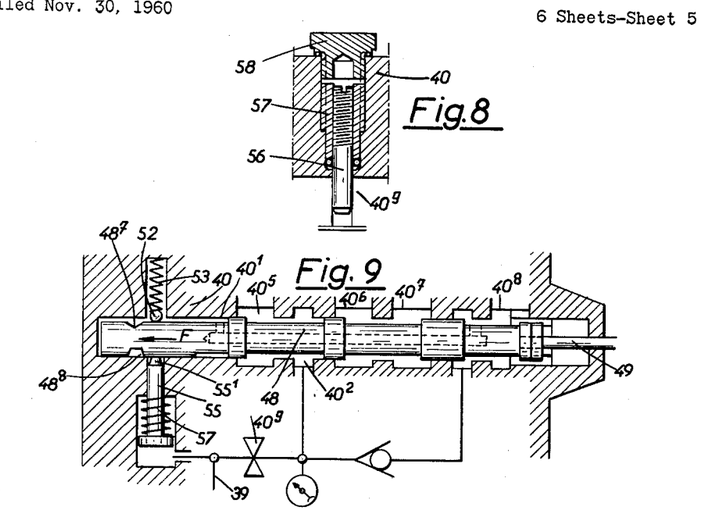
FIGURE 8 is a view partly in section of a pressure reducing valve taken along the line 8—8 of FIGURE 7.
FIGURES 9, 10 and 11 are schematic views of the change-over valve which respectively illustrate different positions of the slide valve of the change-over valve.

The transmission mechanism assembly also includes the change-over valve 40, shown in greater detail in FIGURES 7 and 8. The change-over valve 40 controls the hydraulic flow in the circuit for operating or disconnecting the transmission mechanism in order to provide:

(1) Simultaneous lubrication of both sets of brake discs 28, 29 and 31, 32 which are disengaged when the valve 40 is in neutral position which corresponds to the position when the transmission mechanism is disconnected.

(2) Coupling one of the gear trains for forward movement of the vehicle by moving the piston 35 in the direction in which the brake discs 31 and 32 are engaged, while providing flow of lubricating oil to the brake discs 28 and 29 which remain disengaged.

(3) Coupling the other gear train for reverse movement of the vehicle by moving the piston 35 in the opposite direction in which the brake discs 28, 29 are engaged, while providing flow of lubricating oil to the brake discs 31 and 32 which remain disengaged.

The lubrication of the brake sets is particularly important to provide long life and good frictional qualities for the brake discs because they are regularly cooled and cleaned by the oil lubrication. Lubrication of the brake discs is controlled from the change-over valve 40 which is provided with a valve chamber $40^1$ closed at both ends by plugs 46, 47. A slide valve 48 slides axially in accordance with sliding movement of the inner core 49 of a flexible drive member which extends through a guard 47. The other end of the inner core 49 is adapted to be manually displaced as required by the driver of the motor vehicle from the control panel of the vehicle so that upon displacement in one direction the vehicle may continue to move forward but at a reduced speed while upon displacement in the opposite direction the direction of motion of the vehicle may be reversed. Hence the driver cannot command the vehicle to move simultaneously in both directions. The valve chamber $40^1$ is subdivided into several annular distributing chambers between the lands of the slide valve 48. The inlet $40^2$ is in fluid communication with oil from conduit 39 and it is provided with a branch pipe $40^3$ communicating with the pressure responsive supervisory valve or gauge 42 of the change-over valve 40. A branching passage $40^4$ extends from inlet $40^2$ and leads to a tubular relief valve 50 which is urged to its closed position by a spring 51 which enables sliding of valve 30 at a predetermined oil pressure and thereby enables venting some of the oil through apertures $50^1$ from which it flows into a collecting chamber, not shown.

The slide valve $40^8$ is provided with several axially spaced projections extending into the valve chamber $40^1$ and subdividing the same into several distributing chambers $40^5$, $40^6$, $40^7$ and $40^8$.

The distributing chamber $40^5$ communicates with conduit $36^5$ which feeds oil to the pressure chamber $36^2$ of the piston 35 and cylinder 36 to urge the piston in the direction in which it engages brake discs 31 and 32 to immobilize internal gear 21 so that the power from the transmission shaft 17 is transmitted through sun gear 19, planet gears 22, and the spider 23 to the final drive shaft 24 whereby the vehicle continues to move in the same direction (forward or rearward) but at reduced speed.

The distributing chamber $40^6$ communicates with conduit $36^4$ which feeds oil to the pressure chamber $36^1$ to urge the piston in the direction in which it engages brake discs 28 and 29 to immobilize spider 27 so that power from transmission shaft 17 rotates the sun gear 18, rotates gears 26, rotates internal gear 20 and spider 23 thence to the final drive shaft whereby the vehicle moves in the direction which is reverse to the initial direction of movement of the vehicle whether forward or rearward.

The distributing chamber $40^7$ communicates with passages $1^6$ and $34^1$ constituting conduit means for feeding feed fluid for lubricating the brake discs 31, 32 of the forward drive and which also enables return flow of the oil to the pan.

The distribution chamber $40^8$ communicates with the passage $1^5$ which feeds fluid for lubricating the brake discs 28, 29 of the reverse drive and which also enables return flow of the oil to the pan.

Further passages are provided on the slide valve 48 between annular projections $48^1$, $48^2$ and $48^3$ on the slide valve. The slide valve 48 is axially traversed by a passage $48^4$ and formed with radial passages $48^5$ and $48^6$ which enable free oil flow when the change-over valve is in its neutral position when the oil flows freely through the valve 40 into the casing and back to pan 2.

The neutral position of the change-over valve 40 is the position in which the transmission mechanism is disconnected either in accordance with the command of the driver of the vehicle or in accordance with an automatically operated means which disconnects the mechanism whenever the velocity of the engine or of the vehicle is above a predetermined minimum. Hence the neutral position of the change-over valve is very important and it must be well indicated and known to the driver of the vehicle.

For the purpose of indicating the neutral position there is provided a ball 52 urged by a spring 53 formed in a bore of the plug 54 threaded through an opening in the body of the change-over valve 40. The ball 52 is adapted to engage a cut-away $48^7$ in the slide valve 48 to enable sliding the slide valve when required. The driver is given positive indication that the change-over valve is in the neutral position because once ball 52 moves into cut-away $48^7$ additional pressure is required on the part of the driver to move the inner core 49 so that the ball 52 moves out from cut-away $48^7$ and the slide valve 48 is displaced away from its neutral position.

The transmission mechanism is rendered automatically disconnectible when the speed of the vehicle exceeds a predetermined limit by providing a safety controller which renders the mechanism inoperable or which disconnects the mechanism whenever the velocity of the vehicle or its engine is too high so that the mechanism might be destroyed, or the driver injured or the load carried by the vehicle damaged. The safety controller regulates the operation of the mechanism either for reversing the direction of movement of the vehicle or for reducing the initial speed of the vehicle in whichever direction it was moving when a command was given by the driver so that the mechanism can only operate when the vehicle is moving at a safe or predetermined speed.

The safety controller is operative to lock the change-over valve in its neutral position whereby the transmission mechanism becomes disconnected so that the operator is then forced to brake deliberately by using the regular braking system of the vehicle, not shown, if the vehicle must be slowed down. Thus, the direction of motion of the vehicle can only be reversed and is only allowed when the vehicle is moving at a speed below the predetermined speed.

The safety controller includes a pressure responsive locking bolt 55 which slides in a radial bore through the valve body 40 which is closed by a threaded plug 56. The end $55^1$ of the bolt is adapted to engage a notch $48^8$ formed on the spool. The central axis of notch $48^8$ and of the cut-away $48^7$ formed on different parts of the spool lie in a common plane transverse to the longitudinal axis of the spool and this plane corresponds to the neutral position of the change-over valve 40. A return spring 57 is provided to normally urge the locking bolt in the position in which the end $55^1$ is disengaged from notch $48^8$.

The safety controller includes a control chamber formed between the surfaces of the bolt 55 and of the bore formed in the valve body 40 for containing the bolt 55. The control chamber is in fluid communication with the oil from conduit 39 upstream of a throttling constriction 49 between conduit 39 and inlet $40^2$. Referring to FIGURE 8, the area of the throttling constriction $40^9$ is adjusted by means of an internally threaded sleeve 56 engaging a threaded screw 57 mounted in a threaded bore in the valve body 40 which is closed by a threaded plug 58. By adjusting the threaded screw 57 the area of the passage is throttled at $40^9$ so that the pressure in the control chamber increases sufficiently to act in opposition to the pressure of the return spring 57 to thereby move the end of the sliding bolt 55 into the notch $48^8$ when the latter is aligned with the locking bolt 55 either upon movement of the slide valve being commanded by the driver or when the slide valve already lies in the neutral position. The pressure of the oil in the control chamber is proportional to the velocity of the engine so that, when the engine moves at sufficient speed or when the vehicle driven thereby moves at sufficient speed, the pressure of the oil increases sufficiently to oppose the pressure of the return spring, whereby the slide valve 48 is locked in its neutral position. Hence, the locking bolt 55 is moved automatically as soon as the speed of the engine exceeds a predetermined limit to disconnect, neutralize, or render inoperative the transmission mechanism so that as the slide valve moves under the bolt it is eventually locked and thereafter the mechanism cannot be used to reverse the direction of movement of the vehicle or reduce the speed of the vehicle when it is moving at a speed which is above a predetermined speed and regardless of the direction of movement of the vehicle at the time when the driver gives a command to the change-over valve 40.

Figure 11:
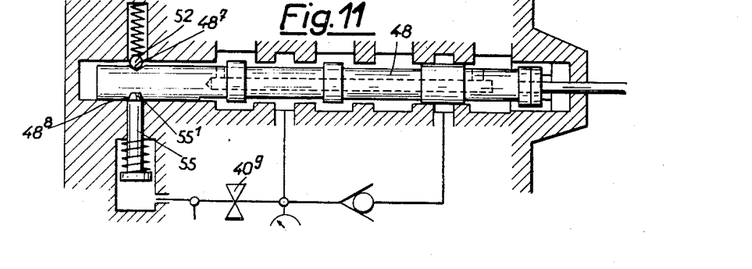
Figure 12:
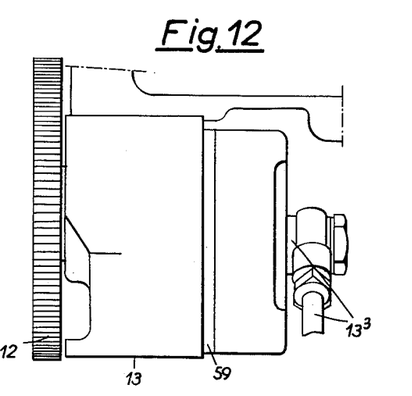
FIGURE 12 is a side view of a rotary pump of the transmission mechanism assembly.
Figure 13:
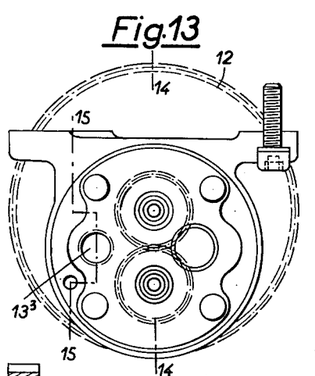
FIGURE 13 is an end view of the pump shown in FIGURE 12, FIGURES 14 and 15 are section views taken respectively along the lines 14—14 and 15—15 of FIGURE 13.
Figure 14:
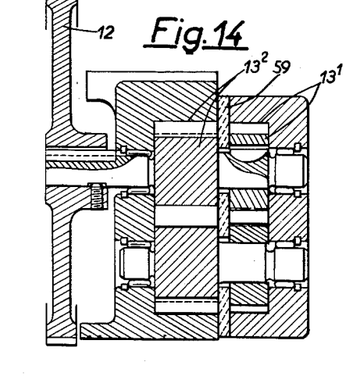
Figure 15:
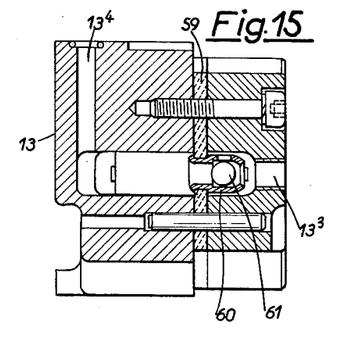

The change-over valve 40 has four operating positions respectively shown in FIGURES 7, and 9 and 11.

Referring to FIGURE 7, the slide valve 48 is in its neutral position, the vehicle is moving at a speed below the predetermined speed so that the safety controller above described is disengaged, the distributing chambers $40^7$ and $40^8$ respectively communicate with passages $40^6$ and $34^1$ and passage $1^5$ so that oil is sprayed over the two sets of braking discs simultaneously, the piston 35 being in its central position.

Referring to FIGURE 9, the slide valve 48 has been moved by the driver in the direction of the arrow F, and the distributing chamber $40^5$ receives oil under pressure and communicates with conduit $36^5$ to feed oil under pressure to pressure chamber $36^2$ of the piston 35 and cylinder 36, to thereby couple the planetary gear set 19, 22 and 23 for rotation about the immobilized internal gear 21, the internal gear 21 being immobilized by the engagement of the piston 35 against the brake discs 32 and 31. The final drive shaft 24 is then rotated in the direction enabling forward movement of the vehicle. The distributing chamber $40^8$ receives oil which flows through passage $1^5$ to lubricate the disengaged brake discs 28, 29 of reverse drive.

Figure 10:
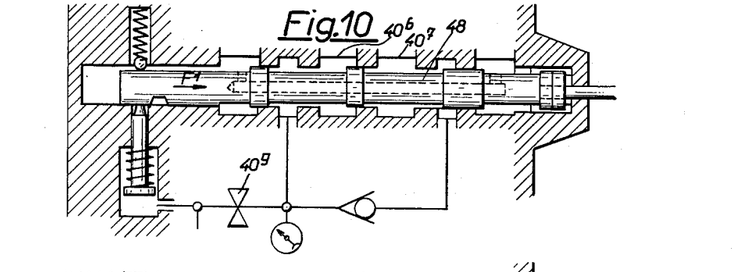

Referring to FIGURE 10, the slide valve 48 has been moved by the driver in the direction of the arrow $F_1$. The distributing chamber $40^6$ and conduit $36^4$ are connected to feed pressure fluid to the pressure chamber $36^1$ to move the piston into engagement with the brake discs 28 and 29 so that the spider 27 is immobilized and the gears 18, 25, 26 and spider 23 are coupled or rotated to enable reverse movement of the vehicle while at the same time distributing chamber $40^7$ receives oil which passes through passages $1^6$ and $34^1$ to lubricate the disengaged brake discs 31, 32 of the forward drive.

Referring to FIGURE 11, the slide valve 48 has been locked in a neutral position by operation of the safety controller after the pressure of the fluid pump through conduit 39 into the control chamber of the locking bolt 55 becomes sufficiently high to overcome the return spring 57, owing to increased speed of the engine or of the vehicle. It is assumed that the driver has attempted to move the slide valve 48 in the direction to reverse the direction of movement of the vehicle while the vehicle was moving at a speed above the predetermined rate or maximum speed for which the transmission mechanism can be used.

In order to decrease the time lag for transmitting a command to reverse the direction of movement of the vehicle while the vehicle is moving or to direct movement of the vehicle while the change-over valve is in neutral position, the rotary pump 13 is provided with a ball valve in a dividing wall which separates the two pumps $13^1$ and $13^2$. The ball valve places the circuits of the two pumps in fluid communication during certain operations of the transmission mechanism and it permits automatic distribution of the hydraulic fluid proportionally to the requirements of the circuits of the two pumps during these commands.

Now referring to FIGURES 12 to 15, the rotary pump 13 consists of the two gear pumps $13^1$, $13^2$. The gear pump $13^1$ directs hydraulic fluid under pressure through opening $13^3$ to the change-over valve 40 and thence to the sets of brake discs for lubricating the same and to the pressure chambers $36^1$ and $36^2$ actuating the double acting piston 35. The gear pump $13^2$ directs hydraulic fluid under pressure through opening $13^4$ to the fluid coupling or hydraulic torque converter and a portion of this fluid is directed into some of the lubricating circuits in the manner earlier described. The gear pumps are driven by the driven gear 12 which is operated in the manner earlier described.

A dividing wall 59 separates the pumping compartments of the two gear pumps $13^1$ and $13^2$ to thereby provide complete separation between the two hydraulic circuits. The two hydraulic circuits can be temporarily placed in fluid communication by providing a ball valve through the dividing wall 59 between the two pumping compartments. The ball valve consists of a sleeve 60 having a shoulder $60^2$ and extending through an opening in the dividing wall 59. The end of the sleeve protruding through the opening in wall 59 is flared outwardly at $60^1$ in order to attach the sleeve to the dividing wall. A ball 61 is mounted for free movement inside the sleeve 60 between the shoulder $60^2$ which forms a seat for the ball 61 and a crimp $60^3$ formed in the end of the tube 61. Aperatures $60^4$ are formed radially through the sleeve adjacent the shoulder $60^2$ in order to facilitate circulation of the fluid therethrough and its distribution with minimum interference of the flow of the fluid.

Equivalent valves may be substituted for the ball valve above described, for instance, other valve seats or other movable valves may be provided together with seats of resilient material, or weak springs for holding the ball on its seat. The ball may also be composed of relatively flexible material, for instance of plastic material.

The automatic operation of the ball valve is as follows: In dependence upon of the difference between the pumping pressures, the ball valve is open thereby placing the two pumping compartments in fluid communication or closed thereby separating the two pumping compartments.

In this manner and when movement of the vehicle in the reverse direction is commanded the hydraulic fluid in the circuit for operating sets of brakes may be supplemented by additional hydraulic fluid from the hydraulic fluid in the circuit to the fluid coupling or hydraulic torque converter.

Thus, while operating the controls in order to reverse the direction of movement of the vehicle, for instance, when the double acting piston 35 is disengaged from the set of brake discs 31, 32 of the forward drive in order to engage the sets of brake discs 28, 29 of the reverse drive: the hydraulic pressure drops to zero and even becomes negative inside the hydraulic circuit for operating the sets of brake discs and inside the pumping compartment $13^1$ during movement of the double acting piston until it reaches its central position, due to the expansion of the springs $38^1$ and stems 37 in the spring mechanisms acting upon the double acting pistons. Hence supplementary hydraulic fluid must be directed to the hydraulic circuit for operating the sets of brakes and to the pump $13^1$. At the same time the ball 61 is pushed back to the position shown in dashed lines in FIGURE 16 and the hydraulic fluid from the pump $13^2$, to the fluid coupling or hydraulic torque converter, is discharged into the pump $13^1$ and then to the hydraulic circuit for operating the sets of brake discs to thereby provide a very rapid displacement of the double acting piston 35.

This supplementary feeding of hydraulic fluid to the circuit for operating the sets of brake discs continues until the pressure of the hydraulic fluid in this circuit is equal with the pressure of the hydraulic fluid to the fluid coupling or hydraulic torque converter which is cut down by the valve to the converter, that is so long as the springs $38^1$ of the spring mechanisms acting upon the piston which are compressed after the central position of the piston has been reached do not establish a balanced pressure of the hydraulic fluid in the circuit for operating the sets of brake discs.

Figure 16:
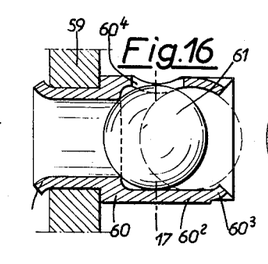
FIGURE 16 is a view on an enlarged scale of a ball valve between two compartments of the pump when in closed position, the dotted lines showing the position of the ball when open to place the compartments of the pump in fluid communication.
Figure 17:
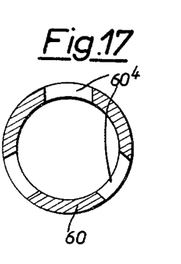
FIGURE 17 is a section view taken along the line 16—16 of FIGURE 16.
Figure 18:
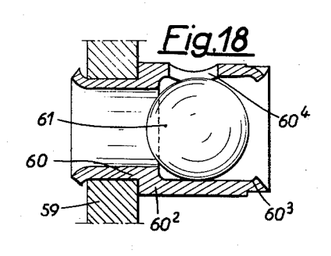
FIGURE 18 is a view similar to that of FIGURE 16 in which the ball is in an intermediary position near its seat but not in contact therewith, when the two compartments of the pump are in throttled fluid communication, when the piston engages the discs of the brakes.

As soon as a balanced pressure of the hydraulic fluid in the circuit for operating the brake discs is obtained, the ball 61 of the ball valve closes progressively (FIGURE 18) and the two circuits are then separated (FIGURE 16). The double acting piston 35 engages with the sets of brake discs of the reverse drive and this engagement takes place slowly and progressively owing to the single reduced flow of hydraulic fluid in the circuit to operate these brake discs. At the same time, the fluid coupling or hydraulic torque converter is again subjected to pressure at the exact moment when it is about to be operated, that is to transmit a driving force as a result of the brake discs then engaged.

This construction has the following advantages:

(1) Very rapid displacement of the double acting piston 35 as it engages the sets of brake discs. This renders the vehicle extremely quick to respond to commands for reversing the movement thereof, while maintaining a maximum of flexibility when starting the vehicle and from all these there results increased safety and saving of time.

(2) Elimination of return or back pressure in the two hydraulic circuits when the piston is in its central position or disengaged position because, in the event the ball-valve was not provided, the fluid converter would be always under pressure even when the change-over valve is in neutral position, which is unnecessary. This provides a decrease in the resistances which must be overcome by the engine moving at slow speed when the change-over valve is in central position and hence more economical operation at slow speed and saving of fuel. In addition, the turbulence of oil or hydraulic flow in the valve of the fluid coupling or hydraulic torque converter is eliminated to thereby reduce heating.

(3) Improved lubrication of the sets of brake discs when they are released. The wear of the brake discs is largely reduced and this results in a decreased wear of the transmission mechanism. Also, there is also obtained improved cooling of the transmission mechanism by intensive circulation of hydraulic fluid against the exterior walls of the casing.

It will be appreciated from the foregoing description that the gear train comprises two planetary gearings consisting of sun gears 18, 19, planet gears 25, 22, spiders 27, 23, internal gears 20, 21, and a linkage $22^1$ securing internal gear 20 and spider 23. The invention is capable of further modification in the sense that the brake disc may be engaged by reciprocable means including mechanical linkages commanded by the driver of the vehicle to reciprocate piston 35. In addition the invention is capable of further modification in obvious manner as regards the various hydraulic passages or conduits provided for the various hydraulic circuits.

What is claimed is:

1. A transmission mechanism enabling the reduction of the speed of a motor vehicle and reversal of the direction of movement thereof, the transmission having first and second gear means for respectively driving the vehicle in opposite directions of travel, and two sets of brake means operable to engage a respective gear means, said transmission mechanism comprising a cylinder, a double acting piston slidably supported in said cylinder for movement in opposite directions, a source of pressure fluid valve means associated with said cylinder and said source for feeding pressure fluid to the cylinder to move the piston therein selectively in opposite directions, said pair of brake means being operatively coupled with said piston for being respectively rendered operative upon opposite directions of movement of the piston, said valve means including a slide valve supported for movement between end positions in which pressure fluid is fed to the cylinder for moving the piston in opposite directions, conduit means for supplying pressure fluid from the valve means to the respective brake means to lubricate the latter, said conduit means being open with said slide valve in a neutral position in which both brake means are inoperable, said slide valve in the end positions thereof blocking the conduit means to interrupt the supply of pressure fluid only to the brake means which has been rendered operable, and means for locking the slide valve in the neutral position thereof when the speed of the vehicle exceeds a predetermined maximum to prevent reversal of the slide valve and thereby reversal of the direction of movement of the vehicle at speeds above said predetermined speed.

2. A transmission mechanism as claimed in claim 1 wherein each set of brake means includes a brake disc mounted adjacent the piston, the brake discs of the two sets being at opposite ends of the piston, said brake means each including a second brake disc laterally mounted with respect to the first said brake disc of the associated set for establishing a drive through the gear means.

3. A transmission mechanism as claimed in claim 2 wherein said piston is hollow and said brake discs are annulus members, the gear means being accommodated substantially within the piston and protected thereby.

4. A transmission mechanism as claimed in claim 3 comprising a casing surrounding the brake discs and cylinder and defining chambers into which abrasions and impurities from the brake discs are centrifugally discharged.

5. A transmission mechanism as claimed in claim 1 wherein said mechanism is provided with a torque converter drivingly connectable to the gear means, said mechanism comprising a hydraulic circuit including separate paths for feeding pressure fluid respectively to the valve means and to the torque converter and means for placing the fluid paths in communication when the pressure difference of the fluid in the respective paths exceeds a predetermined value.

6. A transmission mechanism as claimed in claim 5 wherein said means for placing the fluid paths in communication includes a sleeve, and a ball freely movable in said sleeve, said sleeve having a pair of apertures opening into respective of the fluid paths, said ball being movable between first and second positions in said sleeve dependent upon the difference of pressure in said fluid paths, said ball in said first position blocking one of the apertures and thereby communication between said paths, and in said second position leaving both apertures open whereby the fluid paths are in communication.

7. A transmission mechanism as claimed in claim 6 wherein said sleeve has an end with one of the apertures provided therein, said sleeve having a crimped end remote from the first said end in which is accommodated said ball in the second position thereof.

8. A transmission mechanism as claimed in claim 1 comprising a hydraulic circuit for the circulation of pressure fluid and wherein said source of pressure fluid is a gear pump in said circuit.

9. A transmission mechanism as claimed in claim 8 comprising alternating partitions in the hydraulic circuit to promote settling of impurities.

10. A transmission mechanism as claimed in claim 1 wherein said means for locking the slide valve includes a locking bolt slidably supported for movement in a direction normal to the slide valve, said slide valve having a notch in which is accommodated said bolt with the slide valve in the neutral position, a spring engaging the locking bolt and urging the same away from said slide valve, and means for applying pressure force on said locking bolt to overcome the force of the spring by applying to said bolt a portion of the pressure fluid which is delivered towards the cylinder.

11. A transmission mechanism as claimed in claim 10 comprising means for adjustably throttling the portion of the pressure fluid which is applied to the bolt.

12. A transmission mechanism as claimed in claim 1 comprising spring means urging the piston to a central balanced position in the cylinder corresponding to the neutral position of the slide valve.

13. A transmission mechanism as clamed in claim 1 comprising a ball resiliently applied against said slide valve, said slide valve having a notch accommodating said ball therein with the slide valve in the neutral position.

14. A transmission mechanism enabling the reduction of speed of a motor vehicle and reversal of the direction of movement thereof, the transmission having a torque converter, first and second gear means for being driven by said torque converter for respectively driving the vehicle in opposite directions of travel, and brake means for separately rendering each of the gear means operable, said mechanism comprising: a cylinder, a double acting piston slidably supported in said cylinder for movement in opposite directions, said piston being hollow and accommodating said gear means at least partially therewithin, said brake means including a brake disc at opposite ends of the piston and a brake disc for each of the gear means, a source of pressure fluid, valve means connected to said source for controlling the flow of pressure fluid to said cylinder for moving the piston in opposite directions to respectively engage the brake discs at the ends thereof with the brake discs of the associated gear means to drive the vehicle in opposite directions of travel, a hydraulic circuit including two branches, one feeding the torque converter, the other feeding the valve means, means in said circuit for temporarily providing communication between said branches to permit the flow of fluid from the one feeding the torque converter to the one feeding the valve means to permit initial rapid movement of the piston, conduit means in said other of the branches providing communication between the valve means and the brake discs, said valve means including a slide valve which is movable between end positions whereat respective of the brake discs associated with the piston and the respective brake discs of the gear means are operable, said slide valve having a neutral position in which all the brake discs are disengaged and fluid is fed to the brake discs to lubricate the same, said slide valve in the end positions respectively blocking the conduit means which provides communication with the brake discs which are engaged whereby the brake discs are lubricated only in a state of disengagement and means for locking the slide valve in the neutral position thereof when the speed of the vehicle exceeds a pre-established maximum to prevent reversal of the slide valve and thereby reversal of the direction of movement of the vehicle at speeds exceeding said predetermined speed.

References Cited in the file of this patent
UNITED STATES PATENTS

| | | |
|---|---|---|
| 2,588,462 | Baker et al. | Mar. 11, 1952 |
| 2,726,746 | Herndon et al. | Dec. 13, 1955 |
| 2,749,772 | O'Malley | June 12, 1956 |
| 2,868,341 | Snoy | Jan. 13, 1959 |
| 2,920,732 | Richards et al. | Jan. 12, 1960 |
| 2,969,695 | Christenson et al. | Jan. 31, 1961 |
| 3,016,769 | Christenson et al. | Jan. 16, 1962 |
| 3,033,333 | Breting et al. | May 8, 1962 |